March 18, 1969 HIDENORI TONOOKA ET AL 3,433,542
MULTIFACE CYLINDRICAL BEARINGS FOR GUIDING
ROTATION OF VERTICAL SHAFTS
Filed June 7, 1965 Sheet 1 of 2

INVENTORS
HIDENORI TONOOKA
KINPEI OKANO

BY Paul M. Craig, Jr.
ATTORNEY

United States Patent Office 3,433,542
Patented Mar. 18, 1969

3,433,542
MULTIFACE CYLINDRICAL BEARINGS FOR GUIDING ROTATION OF VERTICAL SHAFTS
Hidenori Tonooka and Kinpei Okano, Hitachi-shi, Japan, assignors to Hitachi, Ltd., Tokyo, Japan
Filed June 7, 1965, Ser. No. 461,631
Claims priority, application Japan, June 8, 1964, 39/32,211
U.S. Cl. 308—121    2 Claims
Int. Cl. F16c 1/24, 33/66, 13/02

This disclosure relates to bearings for use with shafts rotating at high speed and more particularly to cylindrical bearings for guiding the operation of vertical shafts rotating at high speed. The inner bearing surface is composed of plurality of axially extending oil grooves, eccentric wedge surfaces having a radius of curvature less than that of the shaft, and a plurality of bearing surfaces concentric with respect to the shaft.

Cylindrical bearings for use with vertical shafts rotating at high speed have hitherto been proposed in various types and used in practice, which include a cylindrical bearing having a substantially cylindrical inner peripheral face and a plurality of spaced oil grooves provided on the inner peripheral face, and a cylindrical bearing of the so-called Mackenzen or Frössel type in which the radius of curvature of its inner peripheral face is made larger than the radius of the shaft to provide a plurality of wedge-shaped clearances between the shaft and the inner peripheral face of the bearing. The former type of bearing is defective in that, when the shaft is rotated in eccentric relation with the bearing, the pressure generating region is limited to one portion of the inner peripheral face and the bearing has no aligning action with respect to the shaft, resulting in continual instability of the shaft with respect to its radial direction and difficulty of maintaining the precise guidance of the shaft. The latter type of bearing, on the contrary, has a satisfactory aligning action with respect to the shaft and effectively prevents vibration of the shaft. The latter type of bearing, however, is defective in that it is difficult to obtain the necessary degree of precision in respect of, for example, the shape of its inner peripheral face and the surface finishing because complex special working must be resorted to obtain the desired inner peripheral face.

It is therefore the primary object of the present invention to provide a cylindrical bearing for use with a vertical shaft for guiding the operation of the same, which retains the features of the priorly employed bearings of Mackenzen and Frössel type and yet can easily be manufactured to have high precision.

The present invention provides a multiface cylindrical bearing structure for use with a vertical shaft in which a plurality of pressure generating regions of lubricating oil films are formed between the shaft and the bearing as the shaft rotates. An important feature of the present invention resides in that such multiface bearing structure is provided by dividing the inner peripheral face of a cylindrical bearing into a plurality of bearing surfaces each having a normal inside radius of the cylindrical bearing surface and a radius smaller than said normal inside radius so that the bearing surfaces analogous to those of the Mackenzen or Frössel type can be obtained.

The above and other objects, advantages and features of the present invention will become apparent from the following description with reference to the accompanying drawings, in which.

Before proceeding with explanation of the bearing according to the present invention, the structure of conventional cylindrical bearings of this type will first be briefly described so that the invention can more clearly be understood.

Figure 1:
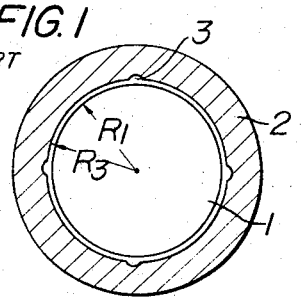
FIGS. 1, 2 and 3 are sectional views showing the structure of conventional cylindrical bearings.
Figure 2:
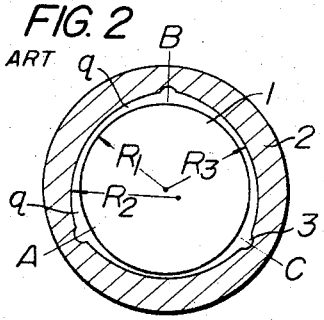
Figure 3:
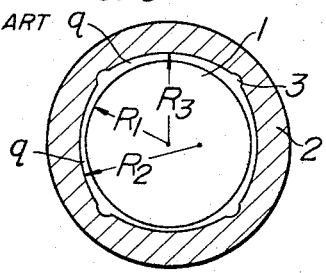

Conventional cylindrical bearings for use with a shaft rotating at high speed have a structure as shown in FIG. 1 in which the bearing 2 has an inner peripheral face of cylindrical shape corresponding to the outer peripheral face of a shaft 1 and a plurality of spaced oil grooves 3 are provided on the inner peripheral face of the bearing 2, or have a structure of the Mackenzen or Frössel type as shown in FIGS. 2 and 3 in which the radius of curvature $R_2$ of the inner peripheral face of the bearing 2 is made greater than the radius $R_1$ of a shaft 1 so that three or four wedge-shaped clearances $q$ are provided between the shaft 1 and the bearing 2.

The bearing of the type as shown in FIG. 1 is defective in that, as described previously, the pressure generating region is limited to a portion of the inner peripheral face due to its lubricating mechanism when eccentricity of the shaft 1 with respect to the bearing 2 takes place. Therefore the bearing 2 when used with a vertical shaft can not attain its aligning action for the rotating shaft 1. As a result, the shaft 1 is always unstable in its radial direction and it is difficult to maintain the required precise guidance of the shaft 1.

On the other hand, in the bearing structures as shown in FIGS. 2 and 3, lubricating pressure is developed in directions surrounding the shaft 1 by the three or four wedge-shaped clearances $q$ formed between the shaft 1 and the bearing 2. It is well known that these types of bearing structures when used with a vertical shaft show a satisfactory aligning action for the rotating shaft 1 and effectively prevent the vibration of the shaft 1. However, in any of the bearing structures shown in FIGS. 2 and 3, the radius of curvature $R_2$ of the inner peripheral face is made greater than the normal inside radius $R_3$ of the bearing 2. Due to such structure, it is generally impossible to work the bearing inner peripheral face by ordinary turning and cutting operation in case of an integral type of bearing and complex special machining must be resorted to. Therefore, the bearing structures shown in FIGS. 2 and 3 are defective in their difficulty of maintaining the required precision in respect of the shape of the bearing inner peripheral face, surface finishing, etc.

Having the prior drawbacks in mind, the present invention provides a bearing which can easily be manufactured and yet retains the features of the Mackenzen and Frössel types of bearings. The present invention will now be described in detail with reference to the drawings with regard to a case in which it is applied to a cylindrical bearing of reversible type for guiding a vertcal shaft.

Figure 4:
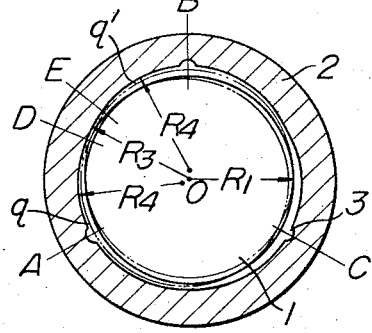
FIG. 4 is a sectional view showing the structure of the cylindrical bearing according to the present invention.

In FIG. 4 wherein like reference numerals appearing in FIGS. 1 to 3 are used to denote like parts, 1, 2 and 3 designate a shaft having a radius $R_1$, a bearing and oil grooves, respectively. The inner peripheral face of the bearing 2 shown in FIG. 4 is so shaped that the wedge-shaped clearance $q$ at the inner peripheral face section AB of the Mackenzen type bearing 2 shown in FIG. 2 is simulated by an arc of radius $R_4 (R_4 \leq R_1)$ for a surface portion AD, an arc of the normal inside radius $R_3$ of the bearing 2 for a surface portion DE, and an arc of radius $R_4$ for a surface portion EB. Inner peripheral face sections BC and CA of the bearing 2 are shaped in the manner similar to the inner peripheral face section AB. As the case may be, the feature of a taperflat slider bearing can be imparted to the bearing of the present invention.

Figure 5:
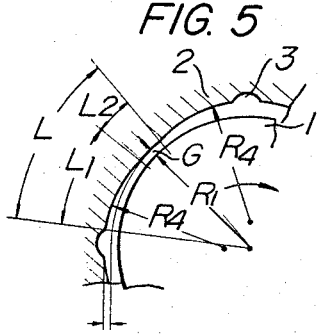
FIG. 5 is an enlarged detail view of part of FIG. 4.

Various parameters for determining the shape of the inner peripheral face of the bearing shown in FIG. 4 are defined as shown in FIG. 5. In FIG. 5, $L_1$, $L_2$ and L represent the length of the arc of the wedge portion formed by the radius $R_4$, the length of the arc of the normal inner peripheral face of the bearing 2 formed by the radius $R_3(R_3=R_1+G)$, and the length of the arc which is the sum of $L_1$ and $L_2$, respectively. T represents the depth which the circle of the radius $R_4$ cuts into the normal inner peripheral face of the bearing 2, while G denotes the radial clearance between the normal inner peripheral face of the bearing 2 and the shaft 1. Distribution of lubricating oil pressure generated about the shaft 1 varies depending on the selection of the parameters L, $L_1$, $L_2$, T and G. Therefore, the load carrying capacity and bearing loss would greatly vary by these parameters.

Figure 6:
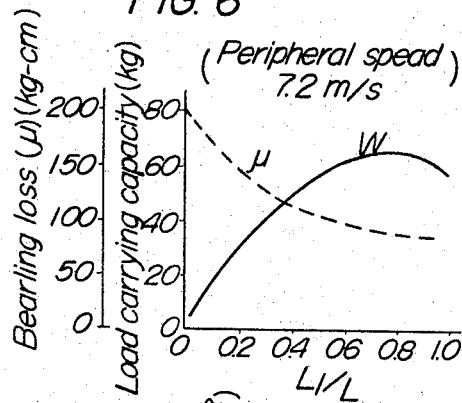
FIGS. 6 and 7 are graphs showing various characteristics of the bearing in accordance with the present invention.
Figure 7:
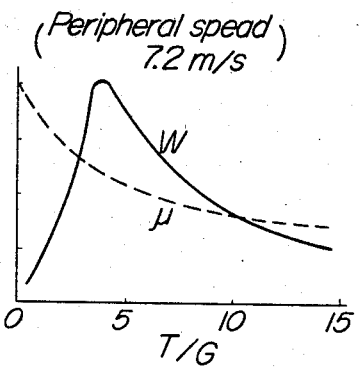

FIGS. 6 and 7 show characteristic curves of the bearing of this invention when adapted for use with a shaft of 300 mm. in diameter, in which its load carrying capacity W and bearing loss $u$ are plotted on the basis of the total lubricating oil pressure relative to the parameters L, $L_1$, $L_2$, T and G forming the inner peripheral face of the bearing. The bearing according to the present invention exhibits a load carrying capacity W and a bearing loss $u$ of about fifteen times and about one half of those of a conventional cylindrical bearing as shown in FIG. 1, respectively, when for example the above parameters are so selected as to give the relations $L_1/L=0.7$ and $T/G=3$.

Figure 8:
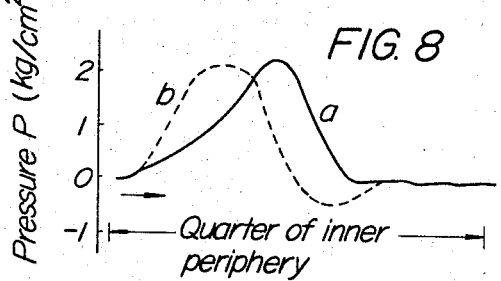
FIG. 8 is a graph showing the pressure distribution in an oil film in the inventive bearing as compared with that of a Frössel type bearing.

FIG. 8 is a graph showing pressure distribution P in a lubricating oil film covering a quarter of the inner peripheral face of a Frössel type bearing as shown in FIG. 3 compared with that of the multiface bearing according to the present invention having its inner peripheral contour simulated to the former. In FIG. 8, curve $a$ represents the pressure distribution in the lubricating oil film of the inventive bearing while curve $b$ represents that of the Frössel type bearing. It will be readily apparent from FIG. 8 by comparison between the curve $a$ representing the distribution characteristic of oil film pressure of the multiface bearing of the present invention and the curve $b$ representing the similar characteristic of the Frössel type bearing that the inventive bearing is advantageous over the Frössel type in its wider region of oil film pressure distribution and that the Frössel type bearing is defective in its tendency to develop negative pressure due to a stretch action of oil film in the vicinity of the point of contact between the shaft and the bearing. Therefore the effective value of length of oil film pressure distribution of the bearing according to the present invention is about 20 percent greater than that of the Frössel type bearing as described above when the ratio between the arc lengths with respect to the load carrying capacity is set at an optimum value, that is $L_1/L=0.7$ as shown in FIG. 6.

It is needless to say and will be readily understood by those skilled in the art that the inner peripheral face of the multiface cylindrical bearing according to the present invention may suitably be modified to suit various services intended thereby and the invention may equally effectively be applied to nonreversible type of bearings.

Figure 9:
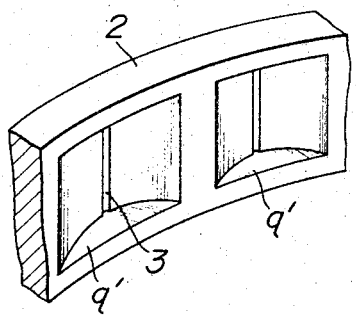
FIGS. 9 and 10 are partial perspective views exemplifying preferred practical structures of the bearing according to the present invention.
Figure 10:
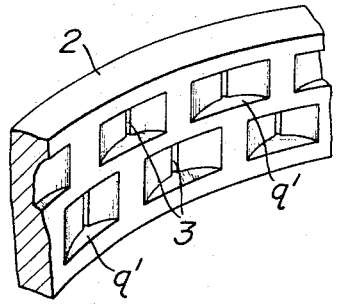

The multiface bearing of the present invention may be shaped as shown in FIGS. 9 and 10. The bearing structure as shown in FIG. 10 is especially advantageous in that the arrangement of wedge-shaped clearances $q'$ in spaced double rows can insure substantially uniform pressure distribution in oil films over the entire peripheral surface of a shaft rotating therein.

From the foregoing description it will be understood that the bearing according to the present invention is advantageous over conventional bearings of this type in that wedge-shaped clearances $q'$ for generating oil film pressure can easily be provided on the bearing surfaces depending on a required load carrying capacity W, in that no negative pressure develops in the lubricating oil film in its wedge-shaped clearances unlike the case with the Mackenzen or Frössel type bearing, in that it has a wider region of pressure distribution of lubricating oil film, in that it has a stable aligning action and in that it can easily be manufactured at high precision.

We claim:
1. In a multiface cylindrical bearing having an inner surface receiving therein and rotationally guiding about a central axis a vertical cylindrical shaft, comprising: a plurality of first cylindrical surfaces being spaced along the circumference of the bearing inner surface, having a first radius of curvature, and being concentric with respect to said central axis; a plurality of second cylindrical surfaces being concave with respect to said central axis, each of said surfaces extending between and adjoining two adjacent ones of said first cylindrical surfaces, having a second radius of curvature shorter than said first radius of curvature, and each being completely radially outward of said first radius of curvature with respect to said central axis; a plurality of oil grooves, each of the grooves being along the radially outermost portion of said second cylindrical surfaces with respect to said central axis wherein the improvement comprises the ratio of the radially measured depth T of said second cylindrical surfaces with respect to said first cylindrical surfaces to the radially measured clearance G between said first cylindrical surfaces and said shaft, that is, $T/G$ is in the range 2 to 7 whereby the distribution of oil pressure generated about the shaft within the inner surface will exhibit optimum load carrying capacity.

2. A multiface cylindrical bearing according to claim 1, wherein the ratio of the circumferential length $L_1$ of one half of one of said second cylindrical surfaces excluding the grooves to the sum of the circumferential length $L_2$ of one of said first cylindrical surfaces and $L_1$, that is $L_1/(L_1+L_2)$ is within the range of 0.5 to 0.9.

References Cited

UNITED STATES PATENTS

| 2,449,297 | 9/1948  | Hoffer    | 308—122   |
| 1,236,511 | 8/1917  | Waring    | 308—240   |
| 1,746,020 | 2/1930  | Whiteley  | 308—239   |
| 2,653,062 | 9/1953  | Sperisen  | 308—73    |
| 3,062,594 | 11/1962 | Bourquard | 308—240 X |
| 3,287,072 | 11/1966 | Buske     | 308—240 X |

FOREIGN PATENTS

| 994,356 | 10/1951 | France.        |
| 190,749 | 7/1957  | Austria.       |
| 322,772 | 7/1920  | Germany.       |
| 295,405 | 1/1929  | Great Britain. |

MARTIN P. SCHWADRON, *Primary Examiner.*

FRANK SUSKO, *Assistant Examiner.*